UNITED STATES PATENT OFFICE.

WILLIAM W. SIMONSON, OF CINCINNATI, OHIO, ASSIGNOR TO C. C. MAC-BRAIR & CO., OF SAME PLACE.

METHOD OF JOINING EDGES OF PREVIOUSLY-WAXED FABRICS.

SPECIFICATION forming part of Letters Patent No. 591,299, dated October 5, 1897.

Application filed April 12, 1897. Serial No. 631,868. (No specimens.)

*To all whom it may concern:*

Be it known that I, WILLIAM W. SIMONSON, a citizen of the United States, residing at Cincinnati, in the county of Hamilton and State of Ohio, have invented a new and useful Method of Joining the Edges of Previously-Waxed Fabrics, of which the following is a specification.

In the manufacture of certain articles—such as bags, &c.—in which the fabric is provided with a waxed or oiled coating, as paraffin, it has been found necessary to make the article out of the fabric in its normal or natural state and then apply the coating or wax material owing to the inability to make a strong joint or seam between the waxed surfaces where the fabric is first coated. This difficulty has arisen from the repellent power of the coating to the adhesive material required to make the joint; but I have discovered that by applying heat and pressure to the seam after the adhesive material has been placed between the two edges the adhesive material is caused to penetrate the otherwise impervious coating and to come into contact with and adhere to the fibers to such an extent as to produce a good strong joint, which will hold the edges together for any desired purpose.

My invention therefore relates to the method of joining together waxed or oiled edges to form a seam or joint, as will be hereinafter more particularly set forth.

To carry out my process, I take glutinous matter, paste, cement, or other suitable sticking material of stiff consistency with little moisture in it and apply it in a strip or band of desired width along the margin of one of the sheets of paper or other fabric to be seamed together. I then lap upon this the margin of the other sheet to be so united and under some pressure pass over or press upon the joint or seam so formed a heated iron or other suitable implement, by which operation the protecting-wax hitherto impervious to the sticking material is so softened or melted that the stiff sticking material penetrates to the fiber or substance of the fabric, fixing and setting itself firmly thereto, while the heat quickly evaporates the moisture of the sticking material, stimulating its chemical action, if any, and leaves the two margins of fabric firmly seamed together and without materially impairing its coating or filling of protecting material.

Heretofore the impervious nature of the coating or filler of such fabrics has been an insurmountable and an impassable barrier or obstacle to securely uniting or seaming them together by the usual methods of gluing, pasting, or cementing. My discovery renders it practicable.

This process is applicable both to coated or to saturated paper or other fabric, whether waxed, oiled, or otherwise similarly treated.

Having thus described my invention, I claim—

1. The herein-described method of seaming or joining together the edges of previously-waxed fabric consisting in applying an adhesive material thereto, then overlapping said edges, and then applying heat and pressure to the edges, substantially as set forth.

2. The herein-described method of seaming or joining together the edges of previously-waxed fabric, consisting in applying a glutinous adhesive material thereto, then overlapping said edges, and then applying heat and pressure to the edges, substantially as set forth.

In testimony of which invention I have hereunto set my hand.

WILLIAM W. SIMONSON.

Witnesses:
C. C. MACBRAIR,
JOHN ELIAS JONES.